United States Patent [19]
Kremer et al.

[11] Patent Number: 5,769,906
[45] Date of Patent: Jun. 23, 1998

[54] PROCESS FOR RECOVERING THE SALT CONSTITUENTS FROM HARDENING-SHOP SALT BATHS

[75] Inventors: Mattias Kremer, Wiesbaden; Georg Wahl, Rodenbach; Eberhard Gock, Goslar; Stefan Wigger, Hanau; Jörg Kähler, Clausthal-Zellerfeld, all of Germany

[73] Assignee: Durferrit GmbH Thermotechnik, Mannheim, Germany

[21] Appl. No.: 721,658

[22] Filed: Sep. 27, 1996

[30] Foreign Application Priority Data

Oct. 6, 1995 [DE] Germany .................. 195 37 198.4

[51] Int. Cl.⁶ .................. C01D 3/08; C01F 1/00
[52] U.S. Cl. .................. 23/302 R; 23/303; 23/304; 423/155; 423/158; 423/184
[58] Field of Search .................. 423/155, 158, 423/184; 23/295 R, 302 R, 303, 304

[56] References Cited

U.S. PATENT DOCUMENTS

| | | | |
|---|---|---|---|
| 2,839,360 | 6/1958 | Alma et al. | 23/90 |
| 3,847,597 | 11/1974 | Mueller et al. | 23/304 |
| 3,865,921 | 2/1975 | Reinhardt et al. | 423/165 |
| 3,949,052 | 4/1976 | Muller | 423/155 |
| 3,950,490 | 4/1976 | Müller et al. | 23/303 |
| 3,953,570 | 4/1976 | Muller | 423/155 |
| 3,966,508 | 6/1976 | Mohr | 148/15 |
| 4,158,579 | 6/1979 | Foreman et al. | 148/15 |
| 4,396,439 | 8/1983 | Foreman | 148/15 |

FOREIGN PATENT DOCUMENTS

| | | |
|---|---|---|
| 2192177 | 2/1974 | France . |
| 355 299 | 6/1922 | Germany . |
| 429716 | 6/1926 | Germany . |
| 648903 | 1/1951 | United Kingdom . |

OTHER PUBLICATIONS

Chemical Abstract, vol. 124, No. 16, 15 Apr. 1996 Columbus, Ohio, US; abstract No. 206372, Marton, Attila et al: "Process For Wasteless, Material—And Energy Saving Complex Processing Of Waste Steel Hardening Salts Contg Chlorides And Cyanide For Recycling."

Erzmetall (1996), 49(7/8), 455–462 Coden: Erzmak;ISSN: 0044–2658, 1996, XP000615749 Wigger, Stefan et al: "Recovery of waste salts from heat treating facilities".

Primary Examiner—Gary P. Straub
Attorney, Agent, or Firm—Beveridge, DeGrandi, Weilacher & Young, LLP

[57] ABSTRACT

The process for environmentally acceptable and economical recovery of chloride salts from hardening-shop used salts utilizing the steps of leaching of the used salt, detoxification of the cyanide and selective crystallization of the individual chloride salts. The process is characterized in that all the chloride salts that are present in the hardening-shop used salt are recovered in pure form.

2 Claims, 1 Drawing Sheet

PROCESS FOR RECOVERING THE SALT CONSTITUENTS FROM HARDENING-SHOP SALT BATHS

BACKGROUND OF THE INVENTION

The invention relates to a process for recovering the alkali metal and alkaline-earth metal chlorides from used salts that accumulate in the course of the heat treatment of steel parts in salt baths, by dissolution of the used salt constituents in water, separation of the insoluble residue, optional eradication of the cyanides and fractional crystallization of the dissolved salts.

For a long time, use has been made of various heat-treatment processes in order to increase the hardness or wear resistance of steel. Amongst these processes, salt-bath technology, in which the work pieces are treated in salt melts, occupies an important position in the anti-wear industry. In a number of salt-bath processes, for example carbonitriding, case hardening, carburizing, annealing and cooling in salt baths, chloridic waste salts, so-called used salts, accumulate. There are several causes for the formation of these used salts—for example, salt melts become contaminated by the work pieces in the course of the steel treatment. For a smooth processing sequence these contaminants have to be removed in the form of sludge, 60to 90% of which also consists of salts. In the course of the reactions with the work pieces the active bath components are additionally consumed, so that they have to be replenished by regenerators or by addition of fresh salt. To this end, a part of the consumed bath, in many cases, has to be ladled out and likewise disposed of as used salt.

The main components of chloridic hardening-shop used salts are the chlorides of alkali and alkaline-earth metals—ie, of sodium, potassium, barium and calcium; a lesser proportion of the used salts also contains potassium cyanide and sodium cyanide.

Hitherto these used salts have been regarded as not economically recoverable, so that efforts to lessen the problem of residual material have concentrated primarily on improving disposability and on partial detoxification. To this end a process for immobilizing a mixture of used salt and gypsum by heating to 850° C. has for example been suggested (DE-OS 21 50 679). Another process for improving the disposability provides for the treatment of the used salt with iron sulphate and sodium sulphate at a temperature between 600° and 900° C. (DE-OS 38 43 285). Various possibilities for detoxification of the cyanide in the used salt have also been published in the past. One way is the injection of oxygen or water vapor into the molten used salt at a temperature between 800° and 1000° C. (DE-OS 23 40 523).

These processes have the serious disadvantage that, on the one hand, they are very energy-intensive and, on the other hand, their aim is not the recovery of the salt constituents but merely simplification of the disposability.

Besides, there have already been attempts to recover the valuable substances from the used salts. For instance, separation of the barium portion by precipitation in the form of barium carbonate or barium sulphate has been described at various times. On the other hand, no particulars are stated with respect to the recovery of other constituents such as sodium chloride and potassium chloride. In addition, the processing of the precipitated barium compounds so as to yield barium chloride is associated with extra process steps and costs.

The partial recovery of salt constituents from hardening shop used salts is described in DE-OS 24 00 318 and DE-OS 24 00 319. After the cyanide detoxification, which is carried out in the melt at 450° to 550° C., the used salt is leached with hot water. The residue, the greater part of which consists of barium carbonate, is separated and supplied to a further processing stage, so as to yield barium chloride for example. The dissolved carbonate is converted into carbon dioxide by addition of nitric acid, and the quantity of chloride is reduced to between 10and 15wt-% by evaporation of the water, whereby sodium chloride is recoverable in the form of crystallization product. The remaining solution is dried at 160° C. and the salt mixture consisting of nitrate and nitrite as well as two per cent sodium chloride and potassium chloride is said to be capable of being used again directly in hardening shops. However, this process also has disadvantages which have prevented conversion on a large scale. For instance, upon addition of nitric acid nitrous gases are released in relatively large amounts and have to be subjected to catalytic incineration. However, avoiding the addition of acid by introduction of barium nitrate into the solution requires in turn an additional process step. In particular, the purities of the salts obtained do not conform to the demands placed on raw materials for the production of hardening salts and are greatly dependent on the composition of the used salts employed, which is subject to considerable fluctuations. By reason of the variable composition the recovered nitrate-nitrite salt is also not capable of being re-used directly, particularly since the specified chloride concentration does not comply with the technical requirements. In addition, through the use of regenerators the composition of the accumulating used salts has in recent years changed in the direction towards lower cyanide and carbonate contents and greater proportions of chloride. The described process is unable to comply with these changed overall conditions without additional process steps.

Processes for the separation of alkali metal and alkaline earth metal chlorides are known per se. One process for the salting-out of barium chloride from solutions is based on the addition of 250 g/l sodium chloride to a heated concentrated solution of barium chloride, as a result of which barium chloride-2-hydrate precipitates out, and after washing with a solution of barium chloride the salt can be obtained with a purity of 99 to 100% (DE-PS-429 716). Another process provides for separation of sodium chloride and potassium chloride (GB-PS-648 903). In this process a mixture of the two salts in a 55% solution of calcium chloride is dissolved at 950° C., whereby sodium chloride precipitates out. To the remaining solution additional solid calcium chloride is added, and this solution is concentrated by evaporation at 95° C. to such an extent that a double salt consisting of calcium chloride and potassium chloride crystallizes out. This double salt is then dissolved with a 27% solution of calcium chloride at 38° C. and this solution is cooled to 15° C., whereby potassium chloride crystallizes out. However, neither process is directly applicable to the hardening-salt problem, since here highly variable compositions of the solution have to be reckoned with, and as a result other process conditions obtain.

OBJECT OF THE INVENTION

The object of the present invention was therefore to develop a process for recovering the alkali metal and alkaline-earth metal chlorides from used salts that accumulate in the course of the heat treatment of steel parts in salt baths, by dissolution of the used-salt constituents in water, separation of the insoluble residue, optional eradication of the cyanides and fractional crystallization of the dissolved salts, whereby said process should be applicable to all used-salt compositions and all used-salt constituents should be recoverable.

In accordance with the invention this object is achieved in that by addition of hydrochloric acid the barium carbonate is separated from the residue in the form of barium chloride and is supplied to the salt solution, in that by addition of sodium chloride and calcium chloride in a ratio of 1:1 to 5:1 at temperatures from −5 to +20° C the barium chloride is crystallized out of the salt solution, whereby for every 300 g/l of used salt in the solution 150 to 350 g sodium chloride and 30 to 150 g calcium chloride are added, in that by addition of calcium chloride until a concentration amounting to between 150 and 400 g/l is attained at a temperature from 40° to 120° C. the sodium chloride is crystallized out, in that by concentrating the solution at 60° to 120° C. to a concentration amounting to between 500 and 900 g calcium chloride per liter remaining sodium chloride and barium chloride are crystallized out, in that by further concentrating the solution at 60° to 120° C. a double salt consisting of potassium chloride and calcium chloride is crystallized out, the double salt is dissolved at 35°–40° C. in a 20to 35% solution of calcium chloride and the potassium chloride is crystallized out at 5° to 20° C., and in that the calcium chloride is recovered from the remaining solution as a result of concentration by evaporation.

In case the used salts contain cyanides, the latter have to be oxidatively eradicated by anodic oxidation or by addition of hydrogen peroxide.

It has been found that after crushing of the solid chioridic hardening-shop used salts to a grain size of, advantageously, less than 2 mm, the soluble salt constituents can be completely removed from the solids by leaching 15 kg to 50 kg of used salt in 100 liters of water. Subsequently, complete cyanide detoxification of the suspension is achieved by anodic oxidation or addition of hydrogen peroxide, advantageously with a combination of both processes. By virtue of carbon dioxide and nitrogen being released, at the high salt concentrations a stable foam is formed, the volume of which may amount to a multiple of the solution quantity. It has been found that this foam can be avoided or eradicated by addition of 0.1 to 100 ml of foam-remover solution. The insoluble constituents, consisting of barium carbonate and contaminants arising from the operation of the hardening shop, substantially iron oxides, are separated from the solution by, for example, the addition of flocculating agents with a pH-value of 8.5to 12, whereby the residual concentration of flocculating agents in the solution, also in the case of an overdose of 50per cent, lies below 2 ppm. After conversion of the barium carbonate into barium chloride with hydrochloric acid the iron-oxide sludge can be dehydrated to a residual moisture amounting to 30 to 35 per cent, for example in a filter press. After being washed with water the filter cake no longer contains any salt constituents and, by reason of its low residual moisture, can be disposed of in trouble-free manner.

After neutralization with hydrochloric acid the individual components are selectively separated from the separated salt solutions by selective addition of reagents and a special sequence of crystallization steps. This ensures that for salts of variable composition the process provides invariable products of high purity.

With respect to the recovery of barium chloride it has been found that, contrary to the conventional salting-out with sodium chloride, increases in yield and purity can be achieved by supplementary addition of calcium chloride. At the same time this ensures that defined conditions are established for the next crystallization step, the salting out of sodium chloride. By addition of 150 to 350 g, advantageously 200 to 250 g, of solid sodium chloride and 60 to 300 g of an approximately 50% solution of calcium chloride to one liter of used-salt solution, upon cooling to a temperature between −5° C. and 20° C., preferably 0° C. to 15° C., barium chloride is selectively crystallized out with the exception of a residual content of 1 to 2 wt-%; in addition, the crystallization product has a high degree of purity, generally better than 99%. The weight ratio of the added salts (that is to say, $NaCl:CaCl_2$) amounts to, depending on the content of calcium chloride in the used salt solution, between 1:1 and 5:1, advantageously 3:1, and can be regulated by measurement, for example using ion selective electrodes.

Furthermore it has been found that by subsequent addition of calcium chloride until a concentration of calcium chloride of 150 to 400 g/l is attained at a temperature between 40° C. and 120° C. pure sodium chloride can be crystallized out selectively, whereas the barium chloride remains in the solution.

By concentrating this solution, preferably in a vacuum crystallizer at a temperature between 60° C. and 120° C., in particular at 80° C. to 100° C., the concentration of calcium chloride is increased to between 500 and 900 g/l. It has furthermore been found that the remaining sodium chloride crystallizes out with the exception of less than 0.5 wt-% and the barium chloride crystallizes out almost entirely that is to say, except for traces in the ppm range. This salt mixture can in turn be supplied to the first crystallization stage, so that with this process more than 99.9% of the barium chloride can be recovered.

Potassium chloride can be separated from the remaining solution in known manner by the solution being further concentrated at 60° to 120° C., in particular 80° to 110° C., until calcium-chloride/potassium-chloride crystallizes out in the form of a double salt. The mother liquor is separated and held in intermediate storage. A part of this solution is diluted with water in a ratio of 1:1. In this diluted solution, in which concentrations of 20 to 35 per cent calcium chloride and 0.5 to 1.5 per cent potassium chloride arise, the double salt is 35° to 40° C., preferably at 38° C. By the solution being cooled to between 5° and 20° C., in particular between 10° C. and 15° C., pure potassium chloride crystallizes out. The remaining solution of calcium chloride is partially introduced in preceding process steps, the calcium chloride is recovered from the residual solution as a result of concentration by evaporation, in particular by spray drying.

All the crystallized salts, in particular also the barium chloride-2-hydrate and calcium chloride-2-hydrate salts that contain water of crystallization, are converted by suitable drying into an anhydrous form with a residual moisture amounting to less than 0.1%.

Figure 1:
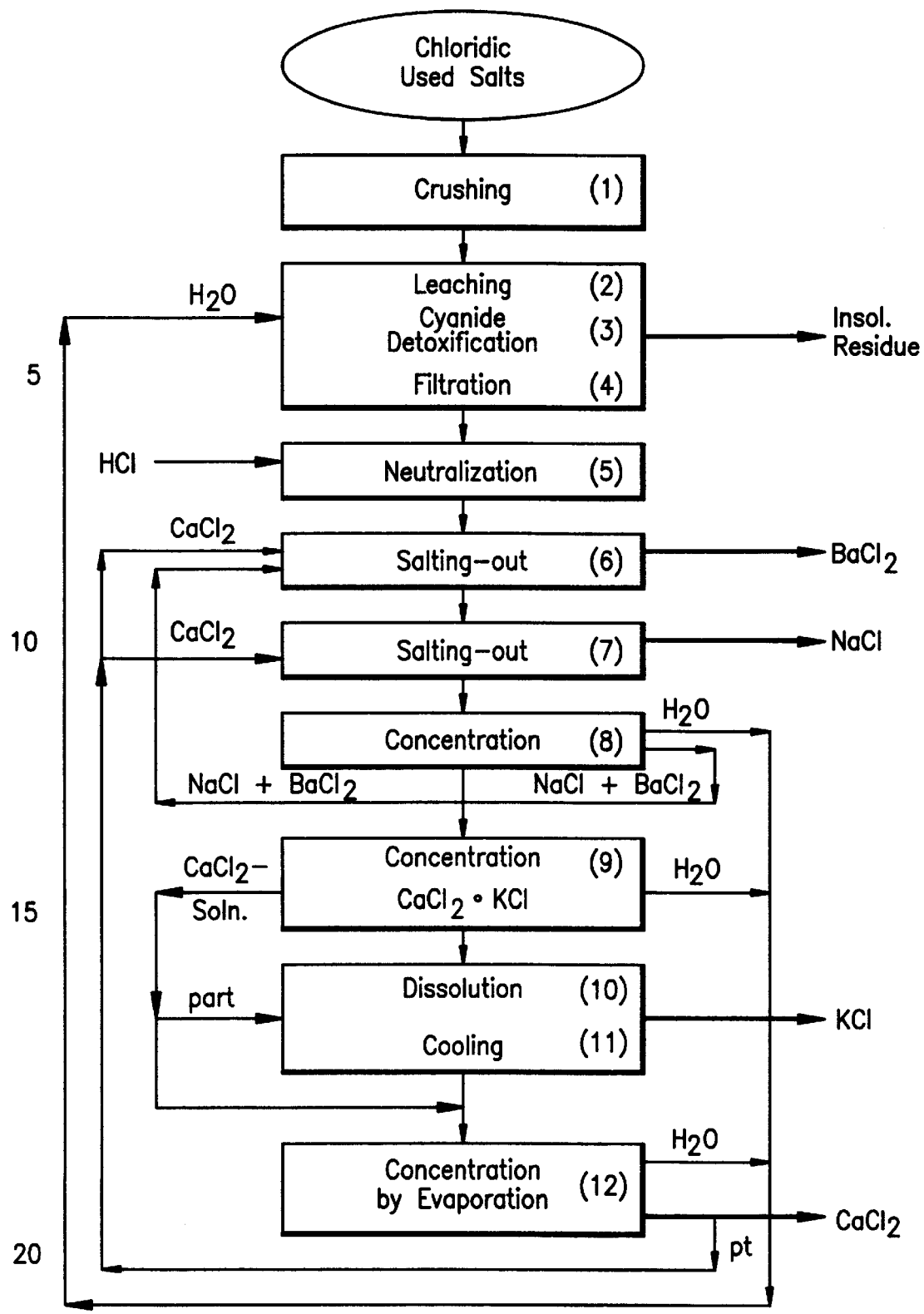
FIG. 1 shows a flow diagram of the process according to the invention in which the sequence of the individual process steps is represented. After crushing (1) of the used salts, leaching (2) with water takes place.

A subsequent cyanide detoxification (3) is the prerequisite for separation of the contaminants by solid/liquid separation, for example filtration (4). From the neutralized solution (5) barium chloride is salted out (6) by addition of sodium chloride. As a result of addition of a hot-saturated solution of calcium chloride, sodium chloride can be crystallized out (7). By concentration of the solution a mixture consisting of sodium chloride and barium chloride (8) is obtained which is used again in step 6. Potassium chloride is separated by concentration of the solution (9), dissolution in a diluted calcium-chloride solution (10) of the $CaCl_2$—KCl double salt that has crystallized out in the process, and subsequent cooling of the solution (11). The calcium chloride is obtained after concentration by evaporation of the remaining solution (12).

DETAILED DESCRIPTION OF THE PREFERRED EMBODIMENTS

The following Examples are intended to elucidate the process according to the invention in greater detail:

1. 100 kg of a cyanide-free used salt are crushed to a grain size of less than 2 mm and leached in 300 l of water. Carbonate and hydroxide are neutralized by addition of 7.9 kg of 37% hydrochloric acid. Subsequently a pH-value of 9.5 is adjusted with sodium hydroxide. The contaminants are flocculated by addition of 1000 ml of 0.1% polymeric flocculating agent solution, and the used-salt solution is separated from the contaminants by filtration. After this, barium chloride is crystallized out at 0° C. by addition of 39.3 kg of salt mixture arising from the evaporative crystallization, 87% of which consists of sodium chloride and 13% of which consists of barium chloride, and also 0.8 kg sodium chloride and 12.2 kg calcium chloride, and is filtered off. To the solution which has been heated to 50° C. there are added 39 kg calcium chloride, and the crystallized sodium chloride is filtered off. Subsequently the solution is concentrated by evaporation at 90° C. until 175 liters of condensate have accumulated, and the crystallized salt mixture consisting of sodium chloride and barium chloride is separated. The solution with a concentration of calcium chloride amounting to 600 g/l is concentrated at 100° C. until a further 46 liters of condensate have been collected. The crystallized double salt consisting of calcium chloride and potassium chloride is separated. 5 liters of the concentrated solution are diluted with 15 liters of water and the double salt in dissolved therein at 38° C. As a result of cooling this solution to 10° C. the potassium chloride crystallizes out and is filtered off. The solution of calcium chloride is subsequently spray dried.

Quantitative analysis of the processing gives the following result.

| Compound | Proportion in used salt | Product quantity | Product purity |
| --- | --- | --- | --- |
| $BaCl_2$ | 56.9% | 57.2 kg | 99.0% |
| $CaCl_2$ | 20.6% | 24.5 kg | 97.0% |
| NaCl | 10.1% | 11.8 kg | 98.7% |
| KCl | 2.6% | 2.0 kg | 97.7% |
| NaOH | 2.0% | 0.0 kg | — |
| $CaCO_3$ | 3.0% | 0.0 kg | — |
| $Fe_3O_4$ (Residue) | 4.8% | 7.0 kg | 32% Residual moisture |

2. The sequence of process steps corresponds to that specified in Example 1, with the difference that conversion of the cyanide by anodic oxidation directly follows the leaching. 100 kg of the cyanide-containing used salt are crushed to a grain size of less than 2 mm and leached in 300 l of water. After this, the cyanide in the used-salt solution with a pH-value of 11 is oxidized to cyanate with the aid of an oxidation electrolysis cell and subsequently, after lowering of the pH-value to 8.5, the cyanate is oxidized further to carbon dioxide and nitrogen. Carbonate and hydroxide are neutralized by addition of 18.2 kg of 37% hydrochloric acid. A pH value of 9.5 is adjusted with sodium hydroxide so that the contaminants are flocculated by addition of 1800 ml of 0.1% polymeric flocculating agent and the contaminants can be separated from the solution by filtration. After this, barium chloride is crystallized out at 0° C. by addition of 38.3 kg of salt mixture arising from the evaporative crystallization, 87% of which consists of sodium chloride and 13% of which consists of barium chloride, 0.8 kg sodium chloride and 25 kg calcium chloride, and is filtered off. To the solution which has been heated to 60° C. there are added 30 kg calcium chloride, and the crystallized sodium chloride is filtered off. Subsequently the solution is condensed by evaporation at 90° C. until 190 liters of condensate have been collected, and the crystallized salt mixture consisting of sodium chloride and barium chloride is separated. The solution, which has a concentration of calcium chloride amounting to 600 g/l, is concentrated at 100° C. until a further 47 liters of condensate have been collected. The crystallized double salt consisting of calcium chloride and potassium chloride is separated. 20 liters of the concentrated solution are diluted with 40 liters of water and the double salt is dissolved therein at 38° C. As a result of cooling the solution to 10° C. the potassium chloride crystallizes out and is filtered off. The solution of calcium chloride is subsequently spray dried.

Quantitative analysis once again shows the high degrees of purity and the complete yield of the salts.

| Compound | Proportion in used salt | Product quantity | Product purity |
| --- | --- | --- | --- |
| $BaCl_2$ | 39.9 kg | 55.5 kg | 98.5% |
| $CaCl_2$ | 10.6 kg | 11.0 kg | 96.1% |
| NaCl | 13.1 kg | 13.5 kg | 99.1% |
| KCl | 10.6 kg | 13.2 kg | 98.6% |
| NaOH | 0.9 kg | 0.0 kg | — |
| $BaCO_3$ | 14.0 kg | 0.0 kg | — |
| KCN | 2.1 kg | 0.0 kg | — |
| $Fe_3O_4$ (Residue) | 8.8 kg | 12.8 kg | 31% Residual moisture |

3. 100 kg of a cyanide-containing used salt are crushed to a grain size of less than 2 mm and leached in 300 l of water. After this, the cyanide in the used-salt solution with a pH-value of 11 is oxidized to cyanate with the aid of an oxidation electrolysis cell and subsequently, after lowering of the pH-value to 8.5, the cyanate is oxidized further to carbon dioxide and nitrogen. Carbonate and hydroxide are neutralized by addition of 23.8 kg of 37% hydrochloric acid. Subsequently a pH-value of 9.5 is adjusted with sodium hydroxide. The contaminants are flocculated by addition of 950 ml of 0.1% polymeric flocculating agent, and the solution is separated from the contaminants by filtration. After this, barium chloride is crystallized out at 0° C. by addition of 36.2 kg of salt mixture arising from the evaporative crystallization, 87% of which consists of sodium chloride and 13% of which consists of barium chloride, and 28.5 kg calcium chloride, and is filtered off. To the solution which has been heated to 60° C. there are added 39 kg calcium chloride, and the crystallized sodium chloride is filtered off. Subsequently the solution is concentrated by evaporation at 100° C. until 185 liters of condensate have been collected, and the crystallized salt mixture consisting of sodium chloride and barium chloride is separated. The solution, which has a concentration of calcium chloride amounting to 600 g/l, is concentrated at 100° C. until a further 48 liters of condensate have been collected. The crystallized double salt consisting of calcium chloride and potassium chloride is separated. 20 liters of the concentrated solution are diluted with 30 liters of water and the double salt is dissolved therein at 38° C. As a result of cooling the solution to 10° C. the potassium chloride crystallizes out and is filtered off. The solution of calcium chloride is subsequently spray dried.

Quantitative analysis of the processing gave the following result.

| Compound | Proportion in used salt | Product quantity | Product purity |
| --- | --- | --- | --- |
| $BaCl_2$ | 26.3% | 54.5 kg | 99.3% |
| $CaCl_2$ | 1.5% | 1.3 kg | 96.7% |
| NaCl | 24.8% | 26.5 kg | 97.6% |
| KCl | 7.3% | 17.4 kg | 98.0% |
| NaOH | 1.1% | 0.0 kg | — |
| $BaCO_3$ | 26.2% | 0.0 kg | — |
| KCN | 8.4% | 0.0 kg | — |
| $Fe_3O_4$ (Residue) | 4.4% | 7.0 kg | 33% Residual moisture |

4. The cyanide-free used salt from Example 1 is processed, with the crystallization temperatures differing from the crystallization temperatures according to the invention. The other crystallization conditions, such as concentration of the added salts and the duration of crystallization, are kept the same as far as possible. 100 kg of the cyanide-free used salt are crushed to a grain size of less than 2 mm and leached in 300 l of water. Carbonate and hydroxide are neutralized by addition of 7.9 kg of 37% hydrochloric acid. Subsequently a pH-value of 9.5 is adjusted with sodium hydroxide. The contaminants are flocculated by addition of 1000 ml of 0.1% polymeric flocculating-agent solution, and the used-salt solution is separated from the contaminants by filtration. After this, barium chloride is crystallized out at 25° C. by addition of 33.9 kg of salt mixture arising from the evaporative crystallization, 92% of which consists of sodium chloride and 8% of which consists of barium chloride, and also 3.9 kg sodium chloride and 12.2 kg calcium chloride, and is filtered off. To the solution which has been heated to 30° C. there are added 39 kg calcium chloride, and the crystallized sodium chloride is filtered off. Subsequently the solution is concentrated by evaporation at 100° C. until 175 liters of condensate have accumulated, and the crystallized salt mixture consisting of sodium chloride and barium chloride is separated. The solution with a concentration of calcium chloride amounting to 600 g/l is concentrated at 100° C. until a further 46 liters of condensate have been collected. The crystallized double salt consisting of calcium chloride and potassium chloride is separated. 5 liters of the concentrated solution are diluted with 15 liters of water and the double salt is dissolved therein at 38° C. As a result of cooling this solution to 25° C. the potassium chloride crystallizes out and is filtered off. The solution of calcium chloride is subsequently spray dried.

Quantitative analysis of the processing gives the following result, which shows a clearly inferior yield of barium chloride and low degrees of purity, particularly in the case of sodium chloride:

| Compound | Proportion in used salt | Product quantity | Product purity |
| --- | --- | --- | --- |
| $BaCl_2$ | 56.9% | 51.3 kg | 99.1% |
| $CaCl_2$ | 20.6% | 25.6 kg | 93.0% |
| NaCl | 10.1% | 16.5 kg | 73.5% |
| KCL | 2.6% | 2.1 kg | 96.5% |
| NaOH | 2.0% | 0.0 kg | — |
| $CaCO_3$ | 3.0% | 0.0 kg | — |
| $Fe_3O_4$ (Residue) | 4.8% | 7.0 kg | 32% Residual moisture |

Further variations and modifications of the foregoing will be apparent to those skilled in the art and are intended to be encompassed by the claims appended hereto.

German Priority Application 195 37 198.4 is relied upon and incorporated herein by reference.

We claim:

1. Process for recovering the alkali metal and alkaline earth metal chlorides from used salts that accumulate in the course of the heat treatment of steel parts in salt baths, comprising;

dissolving the used-salt constituents in water, separating the insoluble residue, eradicating any cyanides present, and fractionally crystallizing the dissolved salts, by the steps of, removing carbonates and hydroxides by the addition of hydrochloric acid, adding sodium chloride and calcium chloride in a ratio of 1:1 to 5:1, whereby for every 300 g/l of used salt in the solution 150 to 350 g sodium chloride and 30 to 150 g calcium chloride are added maintaining the temperature of the salt bath from −5° to +20° C., crystallizing out barium chloride, adding calcium chloride to a concentration between 150 and 400 g/l, maintaining the temperature of the salt bath from 40° to 120° C., crystallizing out sodium chloride, concentrating the salt bath solution, crystallizing out sodium chloride and barium chloride, concentrating salt bath solution, crystallizing out a double salt consisting of potassium chloride and calcium chloride, dissolving the double salt at 35°–40° C. in a 20to 35% solution of calcium chloride, and maintaining the bath temperature at 5° to 20° C., crystallizing out potassium chloride, evaporating the remaining salt bath solution, and recovering calcium chloride.

2. Process according to claim 1, further comprising;

eradicating cyanides by anodically oxidizing the salt solution, or by adding hydrogen peroxide, or by anodically oxidizing the salt solution and adding hydrogen peroxide.

* * * * *